A. B. CLARK.
CASTER WHEEL.
APPLICATION FILED JUNE 12, 1911.

1,037,866.

Patented Sept. 10, 1912.

Witnesses:
Richard Sommer
Leroy S. Hodges.

Inventor
Albert B. Clark
by Geyer & Popp
Attorneys.

UNITED STATES PATENT OFFICE.

ALBERT B. CLARK, OF HAMBURG, NEW YORK.

CASTER-WHEEL.

1,037,866.  Specification of Letters Patent.  Patented Sept. 10, 1912.

Application filed June 12, 1911. Serial No. 632,647.

*To all whom it may concern:*

Be it known that I, ALBERT B. CLARK, a citizen of the United States, residing at Hamburg, in the county of Erie and State of New York, have invented new and useful Improvements in Caster-Wheels, of which the following is a specification.

This invention relates to a wheel which is more particularly designed for use on the casters of trucks although the same may also be used for other purposes.

It is the object of this invention to produce a wheel for this purpose which is stronger and more durable than the wheels heretofore in use for this purpose, which runs easily and is not liable to stretch, and which will not become loose nor detached.

Figure 1:
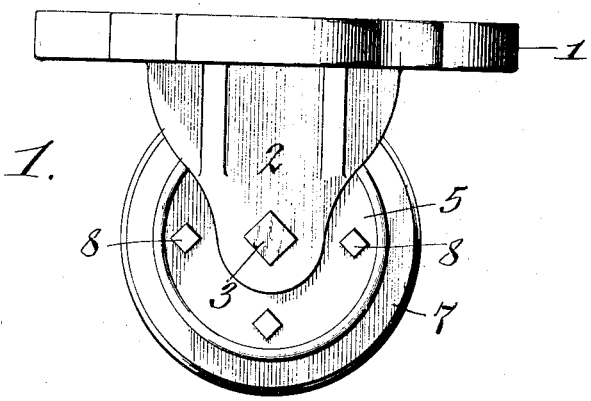
Figure 2:
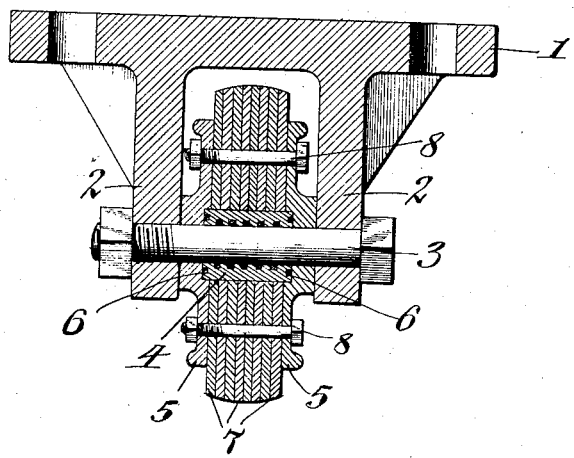
Figure 3:
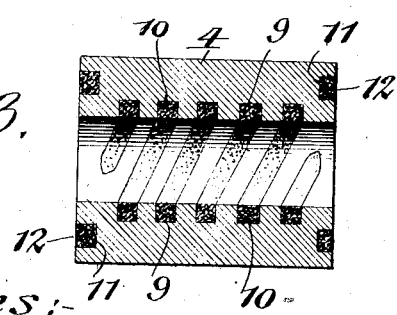

In the accompanying drawings: Figure 1 is a side elevation of a truck caster provided with one of my improved wheels. Fig. 2 is a vertical longitudinal section of the same. Fig. 3 is a longitudinal section, on an enlarged scale, of the bushing forming part of my improved wheel.

Similar numerals of reference indicate corresponding parts throughout the several views.

The bracket forming part of the caster upon which my improved wheel is mounted may be variously constructed but that shown in the drawings comprises an upper base or attaching plate which is adapted to be secured to the body of the truck and two lugs 2 depending from the underside of the attaching plate and provided near their lower ends with coinciding openings which receive a pivot bolt 3 upon which the caster wheel is journaled.

My improved caster wheel is mounted on the pivot bolt between the lugs 2 and is constructed as follows:

4 represents a bushing of tubular form mounted on the central part of the pivot bolt and 5, 5 are two circular or disk-shaped heads or flanges provided with central perforations whereby they are mounted upon the pivot bolt at opposite ends of the bushing. On its inner side and around its central opening each disk or head is provided with a circular counter bore or recess 6 which receives the adjacent end of the bushing. By this means the bushing and end heads are centered or held axially in alinement with reference to each other so that the bores of these parts always engage uniformly with the pivot bolt and the wear upon the same is distributed evenly.

7 represents a plurality of bearing disks which are arranged side by side on the bushing between the end heads of the wheel and which are provided with coinciding central openings which receive the bushing. The bushing and end heads are preferably constructed of metal but the bearing disks 7 are constructed of fibrous material preferably raw hide or leather, firmly cemented, making a solid wheel, inasmuch as this material while running over the floor is comparatively noiseless, somewhat yielding and wears very long. The two heads are firmly clamped against opposite sides of the series of bearing disks and also against opposite ends of the central bushing by means of a plurality of tie members consisting preferably of bolts 8 passing at suitable intervals lengthwise through the two heads and the bearing disks between the same, as shown in Figs. 1 and 2. The bearing disks engage their bores snugly with the periphery of the bushing so that the load is firmly supported and the outer sides of the heads bear against the inner sides of the bracket lugs so that there is no lengthwise play of the wheel on the pivot bolt. The bore of the bushing is provided with recesses 9 which are preferably constructed in the form of spiral grooves and which are filled with graphite 10. The ends of the bushing are also provided with annular grooves 11 which are filled with graphite 12.

My improved wheel can be produced at considerably less cost than wheels of this character provided with rubber tires, they are much more durable and fully as noiseless as rubber tire wheels, and the same are much more durable and capable of withstanding greater wear and tear than rubber tire wheels. Furthermore, this wheel is absolutely waterproof and therefore not liable to become distorted when running over wet surfaces.

I claim as my invention:

A wheel having a plurality of fibrous disks arranged side by side and provided with coinciding central openings, a bushing arranged in said openings and having its opposite ends projecting beyond the outer side of the outermost disks, two heads engaging with the outer side of the outermost disks and provided with central openings and with enlargements or rabbets at the inner ends of their openings which enlargements receive the ends of the bushing, and tie members connecting said disks and heads.

Witness my hand this 25th day of May, 1911.

ALBERT B. CLARK.

Witnesses:
THEO. L. POPP,
ANNA HEIGIS.